United States Patent
Han et al.

(10) Patent No.: US 10,482,827 B2
(45) Date of Patent: Nov. 19, 2019

(54) DISPLAY APPARATUS AND DRIVING METHOD THEREOF

(71) Applicant: BOE TECHNOLOGY GROUP CO., LTD., Beijing (CN)

(72) Inventors: Seungwoo Han, Beijing (CN); Guangliang Shang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 307 days.

(21) Appl. No.: 15/533,761

(22) PCT Filed: Dec. 19, 2016

(86) PCT No.: PCT/CN2016/110652
§ 371 (c)(1),
(2) Date: Jun. 7, 2017

(87) PCT Pub. No.: WO2018/000762
PCT Pub. Date: Jan. 4, 2018

(65) Prior Publication Data
US 2018/0336842 A1 Nov. 22, 2018

(30) Foreign Application Priority Data
Jun. 30, 2016 (CN) .......................... 2016 1 0509600

(51) Int. Cl.
*G09G 3/34* (2006.01)
*H04N 5/369* (2011.01)

(52) U.S. Cl.
CPC ............. *G09G 3/34* (2013.01); *H04N 5/3698* (2013.01)

(58) Field of Classification Search
CPC ............. G09G 3/34; G09G 2320/0252; G09G 3/3685; H04N 5/3698
See application file for complete search history.

(56) References Cited

U.S. PATENT DOCUMENTS

2002/0050965 A1 5/2002 Oda et al.
2006/0125748 A1 6/2006 Yang et al.
(Continued)

FOREIGN PATENT DOCUMENTS

CN 1351324 A 5/2002
CN 101231826 A 7/2008
(Continued)

OTHER PUBLICATIONS

First Office Action in the Chinese Patent Application No. 201610509600.X, dated Dec. 28, 2017; English translation attached.
(Continued)

*Primary Examiner* — Charles V Hicks
(74) *Attorney, Agent, or Firm* — Intellectual Valley Law, P.C.

(57) ABSTRACT

The present application discloses a method for driving a display panel, including receiving one or more frames of image data one after another each of which having image data for a plurality of subpixels in the display panel; determining an initial driving voltage corresponding to one subpixel of the plurality of subpixels based on each frame of image data; determining an overdrive voltage corresponding to the one subpixel based on the initial driving voltage and a compensation voltage corresponding to the one subpixel, wherein an amplitude of the overdrive voltage is greater than an amplitude of the initial driving voltage; and applying the overdrive voltage to the one subpixel for an overdrive time period followed by applying the initial driving voltage to a same one subpixel for displaying a subpixel image associated with each frame of image data.

17 Claims, 2 Drawing Sheets

(56) References Cited

U.S. PATENT DOCUMENTS

| | | |
|---|---|---|
| 2008/0012811 A1 | 1/2008 | Sung et al. |
| 2008/0212875 A1 | 9/2008 | Lee et al. |
| 2013/0235011 A1 | 9/2013 | Lin et al. |
| 2018/0005591 A1* | 1/2018 | Yoshiga ............... G09G 3/3607 |

FOREIGN PATENT DOCUMENTS

| | | |
|---|---|---|
| CN | 101308631 A | 11/2008 |
| CN | 101315747 A | 12/2008 |
| CN | 101399013 A | 4/2009 |
| CN | 101452676 A | 6/2009 |
| CN | 102568430 A | 7/2012 |
| CN | 105280144 A | 1/2016 |
| EP | 1879173 A1 | 1/2008 |
| JP | 2006245924 A | 9/2006 |

OTHER PUBLICATIONS

International Search Report & Written Opinion dated Mar. 24, 2017 regarding PCT/CN2016/110652.

* cited by examiner

DISPLAY APPARATUS AND DRIVING METHOD THEREOF

CROSS-REFERENCE TO RELATED APPLICATION

This application claims priority to Chinese Patent Application No. 201610509600.X, filed Jun. 30, 2016, the contents of which are incorporated by reference in the entirety.

TECHNICAL FIELD

The present invention relates to display technology, particularly, to a display apparatus and a driving method thereof.

BACKGROUND

A liquid crystal display panel produces an image by applying an electric field to a liquid crystal layer between an array substrate and a counter substrate. The array substrate includes a plurality of pixel units, each of which contains a thin film transistor. When a voltage applied to the gate electrode of the thin film transistor exceeds a threshold voltage value, the channel (i.e., the active layer) is turned on, connecting the source electrode and the drain electrode. The signal in the data line is transmitted from the source electrode to the drain electrode, controlling the pixel electrode connected to the drain electrode. The voltage difference between the pixel electrode and the common electrode drives the liquid crystal molecules, resulting in different rotation angles in the liquid crystal molecules and different light transmission intensity.

SUMMARY

In one aspect, the present invention provides a method for driving a display panel comprising receiving one or more frames of image data one after another each of which having image data for a plurality of subpixels in the display panel; determining an initial driving voltage corresponding to one subpixel of the plurality of subpixels based on each frame of image data; determining an overdrive voltage corresponding to the one subpixel based on the initial driving voltage and a compensation voltage corresponding to the one subpixel, wherein an amplitude of the overdrive voltage is greater than an amplitude of the initial driving voltage; and applying the overdrive voltage to the one subpixel for an overdrive time period followed by applying the initial driving voltage to a same one subpixel for displaying a subpixel image associated with each frame of image data.

Optionally, the overdrive voltage equals to a sum of the initial driving voltage and the compensation voltage.

Optionally, determining the overdrive voltage comprises determining the compensation voltage corresponding to the one subpixel; and the compensation voltage corresponding to each of the plurality of subpixels is determined to have an amplitude smaller than or equal to a maximum value of respective amplitudes of all initial driving voltages associated with each frame of image data.

Optionally, determining the overdrive voltage comprises determining the compensation voltage corresponding to the one subpixel; and for each frame of image data, a subpixel having an initial driving voltage with a greater amplitude is determined to have a compensation voltage with a greater amplitude.

Optionally, determining the overdrive voltage comprises for each frame of image data except for a first frame of image data, determining an initial driving voltage amplitude difference for each subpixel; the initial driving voltage amplitude difference being a difference between a first amplitude of an initial driving voltage corresponding to each subpixel based on a current frame of image data and a second amplitude of an initial driving voltage corresponding to each subpixel based on a previous frame of image; and determining the compensation voltage corresponding to the one subpixel; wherein a subpixel having a greater initial driving voltage amplitude difference is determined to have a compensation voltage with a greater amplitude.

Optionally, determining the overdrive voltage comprises determining the compensation voltage corresponding to the one subpixel; for a same subpixel in each frame of image data, the compensation voltage is determined to have a same amplitude.

Optionally, the method further comprises determining the overdrive time period during which the overdrive voltage is applied to the one subpixel.

Optionally, applying the overdrive voltage to the one subpixel comprises sending the overdrive voltage via a signal line to the one subpixel using a data driver; applying the initial driving voltage to the same one subpixel comprises sending the initial driving voltage via a same signal line to the same one subpixel using a same data driver, wherein the overdrive time period is determined to be positively correlated to a length of the signal line.

Optionally, the overdrive time period is set to zero when the length of the signal line is less than or equal to a threshold value.

Optionally, the display panel is a liquid crystal display panel.

In another aspect, the present invention provides a display apparatus comprising a display panel having a plurality of subpixels; an image receiver configured to receive one or more frames of image data one after another, each of which having image data for the plurality of subpixels; an overdrive voltage generator coupled to the image receiver and configured to determine an initial driving voltage for a subpixel based on each frame of image data and to determine an overdrive voltage based on the initial driving voltage and a compensation voltage corresponding to a same subpixel, wherein an amplitude of the overdrive voltage is greater than an amplitude of the initial driving voltage; and a subpixel driver configured to apply the overdrive voltage to the subpixel for an overdrive time period and to apply the initial driving voltage to the same subpixel subsequent to the overdrive time period.

Optionally, the overdrive voltage is equal to a sum of the initial driving voltage and the compensation voltage.

Optionally, for each frame of image data, a subpixel having an initial driving voltage with a greater amplitude is determined to have a compensation voltage with a greater amplitude.

Optionally, for each frame of image data except for a first frame of image data, an initial driving voltage amplitude difference for each subpixel is determined as a difference between a first amplitude of an initial driving voltage corresponding to each subpixel based on a current frame of image data and a second amplitude of an initial driving voltage corresponding to each subpixel based on a previous frame of image; and a subpixel having a greater initial driving voltage amplitude difference is determined to have a compensation voltage with a greater amplitude.

Optionally, for a same subpixel in each frame of image data, the compensation voltage is determined to have a same amplitude.

Optionally, the compensation voltage corresponding to each of the plurality of subpixels is determined to have an amplitude smaller than or equal to a maximum value of respective amplitudes of all initial driving voltages associated with each frame of image data.

Optionally, the subpixel driver comprises a gate driver and a data driver, the gate driver being configured to scan through each row of the plurality of subpixels, the data driver being configured to send the overdrive voltage corresponding to the subpixel followed by the initial driving voltage corresponding to the same subpixel via a signal line to the subpixel, the overdrive time period being positively correlated to a length of the signal line connected between the data driver and said subpixel.

Optionally, the overdrive time period is set zero when the length of the signal line is smaller than or equal to a threshold value.

Optionally, the display panel is a liquid crystal display panel.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Liquid crystal molecules in a liquid crystal layer of a display panel produces a viscous effect when they are rotated by an electrical field. Accordingly, a response time exists for the liquid crystal molecules to reach their expected rotation states under a specific electric field strength. In a high-resolution liquid crystal display panel, when a charging time of a subpixel is less than the response time, the charging rate of the pixel electrode is insufficient which in turn will affect image display quality.

Accordingly, the present disclosure provides, inter alia, a display apparatus and a driving method that substantially obviate one or more of the problems due to limitations and disadvantages of the related art. In one aspect, the present disclosure provides a method for driving a display panel. In some embodiments, the method includes receiving one or more frames of image data one after another each of which having image data for a plurality of subpixels in the display panel; determining an initial driving voltage corresponding to one subpixel of the plurality of pixels based on each frame of image data; determining an overdrive voltage corresponding to the one subpixel based on the initial driving voltage and a compensation voltage corresponding to the one subpixel, wherein an amplitude of the overdrive voltage is greater than an amplitude of the initial driving voltage; and applying the overdrive voltage to the one subpixel for an overdrive time period followed by applying the initial driving voltage to the one subpixel for displaying a subpixel image associated with each frame of image data.

Figure 1:
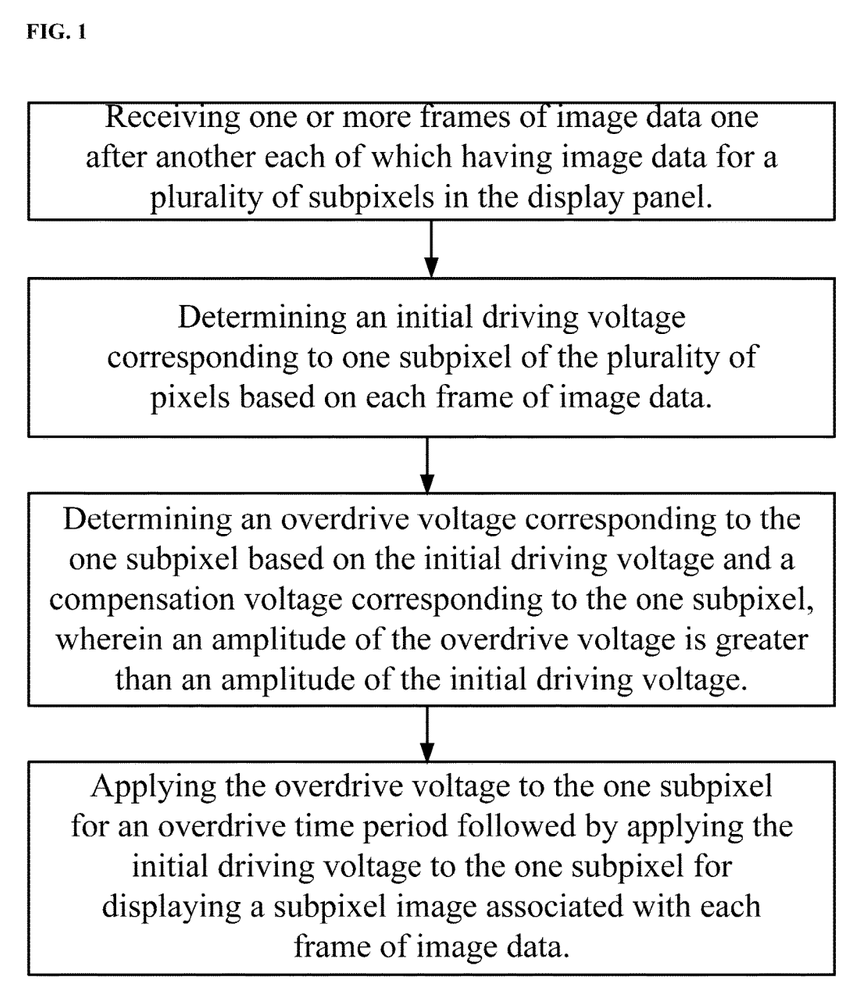
FIG. 1 is a flow chart showing a method for driving a liquid crystal display panel according to some embodiments of the present disclosure.

FIG. 1 is a flow chart showing a method for driving a liquid crystal display panel according to some embodiments of the present disclosure. Referring to FIG. 1, the method includes receiving one or more frames of image data for displaying an image one after another each of which having image data for a plurality of subpixels in the display panel. In each frame of image, a plurality of gate driving voltages are provided in a plurality of—scanning cycles one after another to the plurality of subpixels of the LCD panel. The method further includes a step for determining an initial driving voltage corresponding to a subpixel based on each frame of image data and further determining an overdrive voltage corresponding to the same subpixel based on the just-determined initial driving voltage and a compensation voltage corresponding to the same subpixel. Specifically, the driving voltage or overdrive voltage applied to the subpixel can be either positive or negative depending on the instant polarity of the pixel electrode, as changing polarity of the pixel electrode can help refreshing the potential level of each electrode for properly being charged to create an electric field to control liquid crystal molecules deflection angle so that a desired liquid crystal transmittance can be obtained. In the method, no matter the driving voltage or the overdrive voltage is positive or negative corresponding to a subpixel, the amplitude of the overdrive voltage corresponding to a subpixel is set to be larger than amplitude of the initial driving voltage corresponding to the same subpixel.

Referring to FIG. 1 again, the method further includes, for using each frame of image data to display an image, applying the overdrive voltage to the subpixel that is currently scanned in an overdrive time period followed by applying the initial driving voltage to the same subpixel. Optionally, the above driving method referred to the step for one subpixel may be applicable to all subpixels of the LCD panel. Different overdrive voltages may be applied to different subpixels. Different initial driving voltages may be applied to different subpixels. Different compensation voltages may be determined for different subpixels.

In some embodiments, the present disclosure provides a method for driving the liquid crystal display panel for displaying image frame by frame. During a frame of image for displaying one frame of image data, for each of the plurality of subpixels in the LCD panel, the driving method includes applying an overdrive voltage to a subpixel in an overdrive time period first. The overdrive voltage is provided with an amplitude greater than that of the initial driving voltage normally applied to the subpixel for inducing desired electric field in the liquid crystal for deflecting the liquid crystal molecules towards a target angle. Then, after the overdrive time period, the driving method further includes applying the initial driving voltage to the same subpixel. By having an overdrive time period, the deflection of liquid crystal molecules can quickly reach the target angle. The above process is referred to a subpixel charging process. The faster the liquid crystal molecules are deflected to reach the target angle, the higher the charging rate of the subpixel, ensuring a good image quality displayed within the frame of image by the LCD panel.

In a specific embodiment, for each frame of image to display a frame of image data, the step of determining the overdrive voltage includes determining a compensation voltage corresponding to a subpixel. Optionally, the compensation voltage corresponding to each of the plurality of subpixels is determined to have an amplitude smaller than or equal to a maximum value of all initial driving voltages respectively for the plurality of subpixels for displaying the frame of image data.

Figure 2:
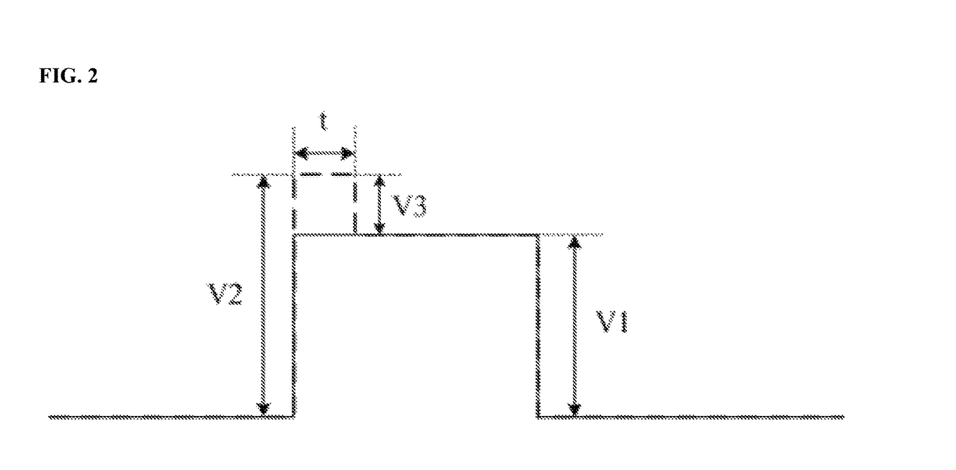
FIG. 2 is a schematic diagram of an overdrive voltage and an initial driving voltage applied to one subpixel according to some embodiments of the present disclosure.

In some embodiments, the driving method includes applying the overdrive voltage to a subpixel, the overdrive voltage is provided as a sum of the initial driving voltage corresponding to the subpixel and a compensation voltage determined for the same subpixel. FIG. 2 is a schematic diagram of an overdrive voltage and an initial driving voltage applied to one subpixel according to some embodiments of the present disclosure. Taking one subpixel as an example, the driving method disclosed above can be distinguished from conventional driving method. Referring to FIG. 2, a plot with solid line depicts a pulse of a driving voltage applied to a subpixel under a conventional driving method. In the same figure, a plot with dashed line depicts a pulse of a driving voltage applied to the subpixel under the present driving method. As shown, a majority of the dashed line overlaps with the solid line except for a smaller portion appeared early in time with a larger amplitude than that of the initial driving voltage. In the conventional driving method, only an initial driving voltage with amplitude V1 is applied to the subpixel. In contrast, in the present driving method, an overdrive voltage with amplitude V2 is first applied to the subpixel for an overdrive time period t. During this overdrive time period, a compensation voltage with an amplitude V3 is added on top of the initial driving voltage for driving the liquid crystal molecules to be deflected faster towards a target deflection angle. After the overdrive time period t, the same initial driving voltage V1 is applied to the subpixel. By having an overdrive time period t, the liquid crystal molecules can quickly reach the target deflection angle, enhancing charging rate of the subpixel and image quality displayed by the LCD panel.

When the liquid crystal molecules are applied with a fixed electric field for too long, their ability to deflect in response to a change of electric field applied to the liquid crystal layer may be compromised. Thus, a LCD panel is generally configured to allow the initial driving voltages respectively applied to the plurality of subpixels constantly changing from a positive voltage to a negative voltage and vice versa. Accordingly, for display each frame of image data, when an initial driving voltage corresponding to a subpixel is a positive voltage, the compensation voltage corresponding to the subpixel is also determined to be a positive voltage. When the initial driving voltage corresponding to a subpixel is a negative voltage, the compensation voltage corresponding to the subpixel is also determined to be a negative voltage.

In some embodiments, the overdrive voltages and initial driving voltages respectively corresponding to the plurality of subpixels of the LCD panel are respectively delivered via one or more data drivers through a plurality of signal lines. In a typical layout of a LCD panel, the data drivers are disposed either at an upper side or at a lower side. The signal lines connecting the data drivers with some subpixels near the upper side or the lower side frame are shorter in lengths with smaller resistances whereas the signal lines connecting the data drivers with some other subpixels farther away from the upper side or the lower side are longer in lengths with larger resistances. Therefore, in the driving method for determining the overdrive voltage and associated overdrive time period is optionally to preset the overdrive time period associated with a subpixel to be positively correlated to the length of the signal line connecting the subpixel to the corresponding data driver. By having this option or design rule, uniformity of charging rates among different subpixels can be further enhanced.

Additionally, for the subpixels near the data drivers, the signal lines connecting these subpixels to the data drivers have relatively shorter lengths and relatively small impedances, resulting in a relatively weak effect of RC delay to the data signals. As a result, applying an overdrive voltage to any of those subpixels during image display may cause a subpixel over-charging problem. In a specific embodiment of the presently disclosed driving method, the overdrive time period t is set to 0 if the signal line length between the data driver and the corresponding subpixel is less than or equal to a threshold value. Here, the threshold value of the signal line length can be obtained empirically. By setting the overdrive time period t to 0, effectively no overdrive voltages are applied those subpixels connected to the data drivers by a signal line having a length less than the threshold value so that the overcharging problem is obviated in those subpixels.

Optionally, the driving method includes an operation for setting a same fixed overdrive time period for delivering overdrive voltages to different subpixels. In this case, charging rates of some subpixels located near the data drivers are relatively high while charging rates of some other subpixels located far away from the data drivers are relatively low.

In some embodiments, the driving method includes determining a compensation voltage for a subpixel after receiving a frame of image data but before displaying the frame of image data. Optionally, the driving method includes determining a compensation voltage for a subpixel after receiving a partial frame of image data. Optionally, the driving method includes determining a compensation voltage for a subpixel after receiving a full frame of image data.

Various embodiments may be practiced for determining a respective compensation voltage corresponding to each of the plurality of subpixels of the LCD panel. In an embodiment, the amplitude of the compensation voltage corresponding to a subpixel is correlated to that of an initial driving voltage applied to the subpixel. When the LCD panel is displaying an image via the plurality of subpixels during a frame of image, each subpixel is applied with a respective initial driving voltage. One option for determining the compensation voltage, depending on each frame of image data, is to set larger amplitude of the compensation voltage corresponding to any pixel for larger amplitude of the initial driving voltage corresponding to the same pixel. In some embodiments, for each frame of image data, a subpixel having an initial driving voltage with a greater amplitude is determined to have a compensation voltage with a greater amplitude. For example, the amplitudes of the compensations voltages for a plurality of subpixels in a frame of image is ranked in a substantially the same order as that for the amplitudes of the corresponding initial driving voltages of the plurality of subpixels. The greater the initial driving voltage, the greater the compensation voltage.

In another embodiment, the compensation voltage corresponding to a subpixel is determined based on a voltage difference between two initial driving voltages respectively applied to the same subpixel during two adjacent frames of image. When a LCD panel is displaying an image during a frame of image, the initial driving voltages applied on to respective subpixels are associated with a current frame of image data. The initial driving voltage corresponding to any one subpixel only changes its value by the time the next frame of image data is received (for displaying a next frame of image in next frame of image). In particular, for each frame of image data except the first frame, an option of determining the compensation voltage is to set a larger amplitude of the compensation voltage corresponding to any subpixel for a larger voltage difference between an initial driving voltage applied to the same subpixel based on a current frame of image data scanned within a current frame of image and another initial driving voltage applied to the same subpixel based on the nearest previous frame of image data scanned in the nearest previous frame of image. In some embodiments, for each frame of image data except for a first frame of image data, the step of determining the overdrive voltage includes a step of determining an initial driving voltage amplitude difference for each subpixel. Optionally, the initial driving voltage difference is a difference between a first amplitude of an initial driving voltage corresponding to each subpixel based on a current frame of image data and a second amplitude of an initial driving voltage corresponding to each subpixel based on a previous frame of image. Optionally, for each frame of image data except for a first frame of image data, the step of determining the overdrive voltage further includes a step of determining the compensation voltage corresponding to the one subpixel, a subpixel having a greater initial driving voltage amplitude difference is determined to have a compensation voltage with a greater amplitude.

In a specific implementation for displaying the first frame of image, the driving method includes applying overdrive voltages to respective subpixels for maintaining proper charging rates to enhancing overall image quality. Optionally, the driving method including applying no overdrive voltages to the subpixels when the first frame of image is displayed on the LCD panel.

In another specific implementation when applying the overdrive voltages to respective subpixels for displaying the first frame of image, the larger of the amplitude of the initial driving voltage corresponding to a subpixel is provided, the larger of the amplitude of a compensation voltage corresponding to the same subpixel is determined. Thus, the overdrive voltages corresponding to respective subpixels can be determined based on the compensation voltages and the initial driving voltages corresponding to the corresponding subpixels.

Optionally, when the first frame of image is displayed and overdrive voltages are applied to respective subpixels, the amplitudes of corresponding compensation voltages can be set to a same value. Thus, the overdrive voltages corresponding to respective subpixels can be determined based on a same compensation voltage and different initial driving voltages corresponding to corresponding subpixels.

In yet another embodiment, the driving method includes setting amplitudes of all compensation voltages for all different subpixels to a same fixed value in association with each frame of image data.

Optionally, for a same subpixel in each frame of image data, the compensation voltage is determined to have a same amplitude.

Figure 3:
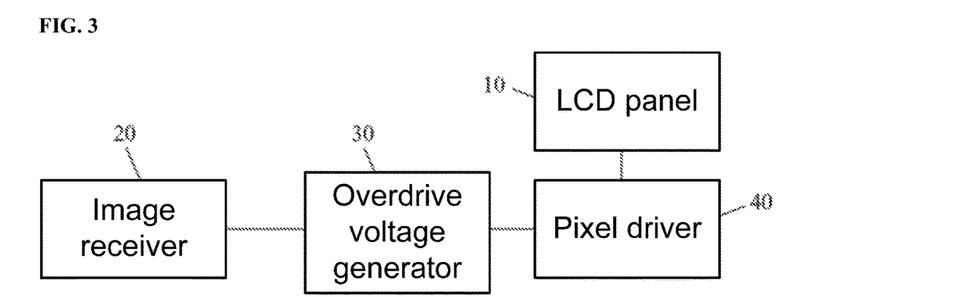
FIG. 3 is a schematic diagram showing a structure of the liquid crystal display according to some embodiments of the present disclosure.

In another aspect, the present disclosure provides a liquid crystal display apparatus including a liquid crystal display panel having multiple subpixels. FIG. 3 is a schematic diagram showing a structure of the liquid crystal display according to some embodiments of the present disclosure.

Referring to FIG. 3, a structure of the liquid crystal display apparatus according to some embodiments of the present disclosure is shown. The liquid crystal display apparatus includes a LCD panel 10 for display image frame by frame in a plurality of sequential frames of image, an image receiver 20 configured to receive one or more frame of image data, an overdrive voltage generator 30 connected to the image receiver 20, and a subpixel driver 40 connected between the overdrive voltage generator 30 and the LCD panel.

In some embodiments, the overdrive voltage generator 30 is configured to determine an initial driving voltage corresponding to a subpixel based on each frame of image data received from the image receiver 20. Further, the overdrive voltage generator 30 is configured to determine an overdrive voltage corresponding to the subpixel based on the initial driving voltage and a compensation voltage corresponding to the same subpixel determined based on a preset rule. Particularly, the amplitude of the overdrive voltage corresponding to each subpixel is greater than that of the initial driving voltage corresponding to the same subpixel.

In some embodiments, the subpixel driver 40 is configured to apply the overdrive voltage, for displaying each frame of image data, to the subpixel that is currently scanned and apply the initial driving voltage to the same subpixel after the overdrive time period. The overdrive voltages corresponding to respective subpixels are generated by the overdrive voltage generator 30 based, at least in part, on the current frame of image data received from the image receiver 20. The overdrive voltages are characterized by their signal amplitudes greater than amplitudes of the initial driving voltages so that liquid crystal molecules in a liquid crystal layer of the LCD panel 10 are leaned towards a target deflection angle. After the overdrive time period, the initial driving voltages applied to the respective subpixels can drive the liquid crystal molecules to reach the target deflection angle more quickly. This results in enhanced charging rates for most subpixels of the LCD panel 10 and in turn guarantees image quality displayed by the LCD panel 10.

In a specific embodiment, the LCD panel provided by the present disclosure is configured, for each frame of image data, to determine amplitudes of compensation voltages corresponding to respective subpixels to be smaller or equal to a maximum value of different amplitudes of all initial driving voltages corresponding to respective subpixels associated with the each frame of image data.

In another specific embodiment, the LCD panel provided by the present disclosure is configured to determine the overdrive voltages corresponding to respective subpixels to be equal to a sum of the initial driving voltages and the compensation voltages corresponding to the respective subpixels.

When the liquid crystal molecules are applied with a fixed electric field for too long, their ability to deflect in response to a change of electric field applied to the liquid crystal layer may be compromised. Thus, a LCD panel is generally configured to allow the initial driving voltages respectively applied to the plurality of subpixels constantly changing from a positive voltage to a negative voltage and vice versa. In a specific embodiment, the LCD panel of the present disclosure is configured to, for each frame of image data, to set the compensation voltage corresponding to any subpixel to be a positive voltage for the initial driving voltage corresponding to the same subpixel being provided as a positive voltage. Similarly, when the initial driving voltage corresponding to a subpixel is a negative voltage, the compensation voltage corresponding to the subpixel is also set to be a negative voltage.

Figure 4:
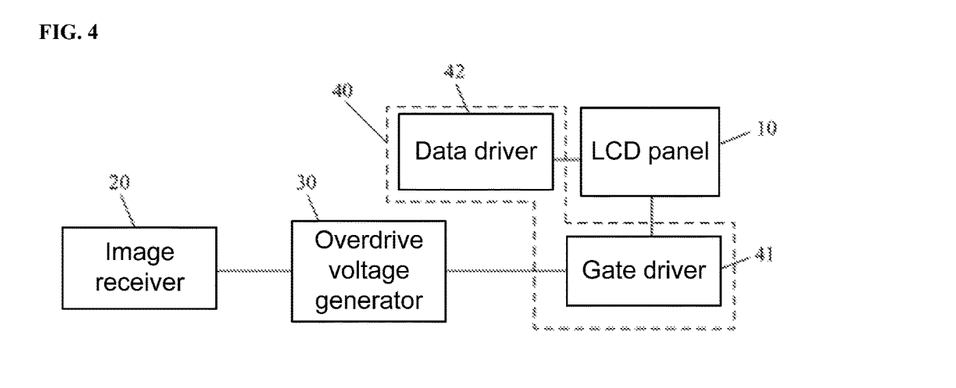
FIG. 4 is a diagram showing a specific structure of a liquid crystal display according to an embodiment of the present disclosure.

In a specific implementation of the LCD panel shown in FIG. 3, FIG. 4 is a diagram showing a specific structure of a liquid crystal display according to an embodiment of the present disclosure. Referring to FIG. 4, the subpixel driver 40 of FIG. 3 includes a gate driver 41 and a data driver 42. The gate driver 41 is configured to scan through each row of the plurality of subpixels of the LCD panel 10 based on a predetermined scanning rule. The data driver 42 is configured to send the overdrive voltage and the initial driving voltage corresponding to respective subpixel via a signal line applied onto the same subpixel. Because of limitation of liquid crystal display panel layout process, the data driver 42 is disposed usually at a top side or a bottom side of the LCD panel 10. Thus, some subpixels that are located near the top side or the bottom side have shorter signal lines with smaller resistance connected to the data driver 42 whereas some subpixels that are located relative farther from the top side frame or the bottom side frame have longer signal lines with larger resistance connected to the data driver 42. Therefore, the LCD panel according to the present disclosure is configured to preset the overdrive time period associated with a subpixel to be positively correlated to the length of the signal line connecting the subpixel to the corresponding data driver so that a substantially uniform charging rate for all subpixels can be obtained.

Additionally, for those subpixels located near the data driver, the signal lines connecting these subpixels to the data drivers have relatively shorter lengths and relatively small impedances, resulting in a relatively weak effect of RC delay to the data signals. As a result, applying an overdrive voltage to any of those subpixels during image display may cause over-charging problem to those subpixels. In a specific embodiment of the presently disclosed LCD panel, the overdrive time period t is set to 0 (or eliminated) if the signal line length between the data driver and the corresponding subpixel is smaller than or equal to a threshold distance which can be obtained by empirical measurements. By setting the overdrive time period t to 0, effectively no overdrive voltages are applied those subpixels within the threshold distance from the data driver so that the over-charging problem can be avoided on those subpixels.

Optionally, the LCD panel is configured to set a same fixed overdrive time period for sending different overdrive voltages to different subpixels. In this case, charging rates of some subpixels located near the data drivers are relatively high while charging rates of some other subpixels located far away from the data drivers are relatively low Optionally, the LCD panel is configured to scan every row of subpixels. Specifically, for each frame of image data, the overdrive voltage generator 30 is configured to set larger amplitude for a compensation voltage corresponding to any subpixel whenever an initial driving voltage corresponding to the same subpixel becomes larger. In some embodiments, for each frame of image data, a subpixel having an initial driving voltage with a greater amplitude is determined to have a compensation voltage with a greater amplitude. For example, the amplitudes of the compensations voltages for a plurality of subpixels in a frame of image is ranked in a substantially the same order as that for the amplitudes of the corresponding initial driving voltages of the plurality of subpixels. The greater the initial driving voltage, the greater the compensation voltage.

Optionally, for each frame of image data, the overdrive voltage generator 30 of the LCD panel of the present disclosure is configured to set the compensation voltage with fixed amplitude corresponding to each subpixel.

The present disclosure provides a LCD panel and a method for driving the same as well as related display apparatus. For displaying each frame of image data, an overdrive voltage is firstly applied to a subpixel for an overdrive time period. The overdrive voltage is provided with amplitude larger than that of an initial driving voltage corresponding to the same subpixel to deflect liquid crystal molecules in the liquid crystal display towards a target angle. After the overdrive time period, the method includes applying the initial driving voltage to the subpixel to make the liquid crystal molecules to reach the target angle quickly within a frame of image so that charging rate of the subpixel is enhanced for improving image quality of the liquid crystal display panel.

Examples of appropriate display apparatuses include, but are not limited to, an electronic paper, a mobile phone, a tablet computer, a television, a monitor, a notebook computer, a digital album, a gaming system, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for driving a display panel comprising:
   receiving one or more frames of image data one after another each of which having image data for a plurality of subpixels in the display panel;
   determining an initial driving voltage corresponding to one subpixel of the plurality of subpixels based on each frame of image data;
   determining an overdrive voltage corresponding to the one subpixel based on the initial driving voltage and a compensation voltage corresponding to the one subpixel, wherein an amplitude of the overdrive voltage is greater than an amplitude of the initial driving voltage; and applying the overdrive voltage to the one subpixel for an overdrive time period followed by applying the initial driving voltage to a same one subpixel for displaying a subpixel image associated with each frame of image data;

wherein determining the overdrive voltage comprises:

for each frame of image data except for a first frame of image data, determining an initial driving voltage amplitude difference for each subpixel; the initial driving voltage amplitude difference being a difference between a first amplitude of an initial driving voltage corresponding to each subpixel based on a current frame of image data and a second amplitude of an initial driving voltage corresponding to each subpixel based on a previous frame of image; and determining the compensation voltage corresponding to the one subpixel;

wherein a subpixel having a greater initial driving voltage amplitude difference is determined to have a compensation voltage with a greater amplitude.

2. The method of claim 1, wherein the overdrive voltage equals to a sum of the initial driving voltage and the compensation voltage.

3. The method of claim 1, wherein determining the overdrive voltage comprises determining the compensation voltage corresponding to the one subpixel; and the compensation voltage corresponding to each of the plurality of subpixels is determined to have an amplitude smaller than or equal to a maximum value of respective amplitudes of all initial driving voltages associated with each frame of image data.

4. The method of claim 1, wherein determining the overdrive voltage comprises determining the compensation voltage corresponding to the one subpixel; and for each frame of image data, a subpixel having an initial driving voltage with a greater amplitude is determined to have a compensation voltage with a greater amplitude.

5. The method of claim 1, wherein determining the overdrive voltage comprises determining the compensation voltage corresponding to the one subpixel;

for a same subpixel in each frame of image data, the compensation voltage is determined to have a same amplitude.

6. The method of claim 1, further comprising determining the overdrive time period during which the overdrive voltage is applied to the one subpixel.

7. A method for driving a display panel comprising:

receiving one or more frames of image data one after another each of which having image data for a plurality of subpixels in the display panel;

determining an initial driving voltage corresponding to one subpixel of the plurality of subpixels based on each frame of image data;

determining an overdrive voltage corresponding to the one subpixel based on the initial driving voltage and a compensation voltage corresponding to the one subpixel, wherein an amplitude of the overdrive voltage is greater than an amplitude of the initial driving voltage;

applying the overdrive voltage to the one subpixel for an overdrive time period followed by applying the initial driving voltage to a same one subpixel for displaying a subpixel image associated with each frame of image data; and determining the overdrive time period during which the overdrive voltage is applied to the one subpixel;

wherein applying the overdrive voltage to the one subpixel comprises sending the overdrive voltage via a signal line to the one subpixel using a data driver; applying the initial driving voltage to the same one subpixel comprises sending the initial driving voltage via a same signal line to the same one subpixel using a same data driver; wherein the overdrive time period is determined to be positively correlated to a length of the signal line.

8. The method of claim 6, wherein the overdrive time period is set to zero when the length of the signal line is less than or equal to a threshold value.

9. The method of claim 1, wherein the display panel is a liquid crystal display panel.

10. A display apparatus, comprising:

a display panel having a plurality of subpixels;

an image receiver configured to receive one or more frames of image data one after another, each of which having image data for the plurality of subpixels;

an overdrive voltage generator coupled to the image receiver and configured to determine an initial driving voltage for a subpixel based on each frame of image data and to determine an overdrive voltage based on the initial driving voltage and a compensation voltage corresponding to a same subpixel, wherein an amplitude of the overdrive voltage is greater than an amplitude of the initial driving voltage; and a subpixel driver configured to apply the overdrive voltage to the subpixel for an overdrive time period and to apply the initial driving voltage to the same subpixel subsequent to the overdrive time period;

wherein the subpixel driver comprises a gate driver and a data driver, the gate driver being configured to scan through each row of the plurality of subpixels, the data driver being configured to send the overdrive voltage corresponding to the subpixel followed by the initial driving voltage corresponding to the same subpixel via a signal line to the subpixel, the overdrive time period being positively correlated to a length of the signal line connected between the data driver and said subpixel.

11. The display apparatus of claim 10, wherein the overdrive voltage is equal to a sum of the initial driving voltage and the compensation voltage.

12. The display apparatus of claim 10, wherein, for each frame of image data, a subpixel having an initial driving voltage with a greater amplitude is determined to have a compensation voltage with a greater amplitude.

13. The display apparatus of claim 10, wherein, for each frame of image data except for a first frame of image data, an initial driving voltage amplitude difference for each subpixel is determined as a difference between a first amplitude of an initial driving voltage corresponding to each subpixel based on a current frame of image data and a second amplitude of an initial driving voltage corresponding to each subpixel based on a previous frame of image; and a subpixel having a greater initial driving voltage amplitude difference is determined to have a compensation voltage with a greater amplitude.

14. The display apparatus of claim 10, wherein, for a same subpixel in each frame of image data, the compensation voltage is determined to have a same amplitude.

15. The display apparatus of claim 10, wherein the compensation voltage corresponding to each of the plurality of subpixels is determined to have an amplitude smaller than or equal to a maximum value of respective amplitudes of all initial driving voltages associated with each frame of image data.

16. The display apparatus of claim 10, wherein the overdrive time period is set zero when the length of the signal line is smaller than or equal to a threshold value.

17. The display apparatus of claim 10, wherein the display panel is a liquid crystal display panel.

\* \* \* \* \*